(12) United States Patent
Golden et al.

(10) Patent No.: US 6,770,390 B2
(45) Date of Patent: Aug. 3, 2004

(54) CARBON MONOXIDE/WATER REMOVAL FROM FUEL CELL FEED GAS

(75) Inventors: Timothy Christopher Golden, Allentown, PA (US); Edward Landis Weist, Jr., Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 155 days.

(21) Appl. No.: 09/978,638

(22) Filed: Oct. 17, 2001

(65) Prior Publication Data

US 2002/0058169 A1 May 16, 2002

Related U.S. Application Data

(60) Provisional application No. 60/248,028, filed on Nov. 13, 2000.

(51) Int. Cl.[7] ................................................ H01M 8/04
(52) U.S. Cl. ......................................................... 429/17
(58) Field of Search ........................................... 429/17

(56) References Cited

U.S. PATENT DOCUMENTS

| 4,522,894 A | 6/1985 | Hwang et al. ................. 429/17 |
| 4,532,192 A | 7/1985 | Baker et al. ................... 429/19 |
| 4,587,114 A * | 5/1986 | Hirai et al. ................... 423/247 |
| 5,330,727 A | 7/1994 | Trocciola et al. ............ 422/177 |
| 5,529,970 A * | 6/1996 | Peng ........................... 502/400 |
| 5,604,047 A | 2/1997 | Bellows et al. ............... 429/19 |
| 5,658,681 A * | 8/1997 | Sato et al. .................... 429/13 |

FOREIGN PATENT DOCUMENTS

| JP | 61-25638 | * 2/1986 |
| JP | 61-146705 | * 7/1986 |
| JP | 61-164642 | * 7/1986 |
| JP | 62-65919 | * 3/1987 |

* cited by examiner

*Primary Examiner*—Patrick Ryan
*Assistant Examiner*—Thomas H. Parsons
(74) *Attorney, Agent, or Firm*—Keith D. Gourley

(57) ABSTRACT

The present invention is a method for production of a hydrogen-rich fuel gas compatible for a fuel cell, comprising; reforming a hydrocarbon-containing fuel to a CO-containing, hydrogen-rich reformate, converting CO in the reformate to $CO_2$ and hydrogen by a catalyzed water-shift reaction, removing residual CO in the reformate by adsorption on a copper halide adsorbent, and passing the essentially CO-free reformate as a hydrogen-rich fuel gas to a fuel cell.

10 Claims, 1 Drawing Sheet

CARBON MONOXIDE/WATER REMOVAL FROM FUEL CELL FEED GAS

CROSS-REFERENCE TO RELATED APPLICATIONS

This application claims the benefit of U.S. Provisional Application No. 60/248,028 filed Nov. 13, 2000.

STATEMENT REGARDING FEDERALLY SPONSORED RESEARCH OR DEVELOPMENT

Not applicable.

BACKGROUND OF THE INVENTION

Fuel cells are devices that react a fuel and an oxidant to generate electricity. Many fuel cells use $H_2$ as a fuel and oxygen or air as an oxidant. The production of $H_2$ typically involves reforming or partial oxidation of a hydrocarbon source to produce an impure $H_2$ stream called synthesis gas. The synthesis gas is traditionally upgraded to pure $H_2$ (99.9+%) using a pressure swing adsorption process. However, fuel cells do not require a pure $H_2$ fuel. The fuel $H_2$ used in a fuel cell does have to be CO-free because CO degrades performance of the cell. Hence, the objective of this invention is to provide an improved process for the production of CO-free $H_2$ that can be used in fuel cell applications.

There is prior art on the production of electricity from fuel cells using $H_2$ as a fuel. In much of the art, the removal of CO from $H_2$ is an important and necessary step in the process. Some of the previous approaches to CO removal are noted below.

U.S. Pat. No. 4,522,894 teaches a process for electric power generation using fuel cells in which a hydrocarbon liquid is passed through an autothermal reactor with 2 different types of catalysts. The synthesis gas produced is then sent to high temperature and low temperature shift reactors which convert CO and water into $CO_2$ and $H_2$. The CO-free $H_2$ produced by shift conversion is then sent to the anode of the fuel cell. Thus, in this art, CO is removed by the catalytic water gas shift reaction.

U.S. Pat. No. 4,532,192 describes a fuel cell system wherein the gas exhausted from the anode section is applied to a gas separation means in which the gas separation means acts to remove unused fuel process gas from the exhaust gas to the exclusion of other gas components. The removed fuel gas, no longer diluted by other gas constituents, is then applied as input fuel to the anode section of the fuel cell. As in the '894 patent, CO removal from the synthesis gas is accomplished by the catalytic shift reaction.

U.S. Pat. No. 5,330,727 describes an apparatus for removal of CO from gaseous media. CO present in gaseous media is diminished by selective oxidation in the presence of oxygen. The oxidation of CO is accomplished in a staged manner. The first CO oxidation occurs at a high temperature to avoid catalyst deactivation then through a second catalyst bed at lower temperature to ensure essentially complete CO removal.

U.S. Pat. No. 5,604,047 comprises a method for lowering the CO content of a CO-containing $H_2$-rich gas stream by contacting the gas stream with an adsorbent capable of preferentially adsorbing CO. The adsorbents employed consist of platinum, palladium, ruthenium, rhenium, iridium, the carbides and nitrides of tungsten, molybdenum, vanadium, chromium, tantalum and mixtures thereof. This is a 2-bed system and the preferred desorbing gas is steam.

The prior art of fuel cell feed gas preparation suffers from inefficiencies, the need for expensive catalysts and multiple stage processing. These deficiencies make such processes unattractive for the economic use of fuel cells to replace traditional sources of electricity and motive power such as vehicles, where low cost, simplicity and efficiency is important for consumer acceptance. The present invention overcomes the drawbacks of the prior art with an inexpensive, efficient and simple method for providing hydrogen fuel for a fuel cell which is purified of the most deleterious contaminant, carbon monoxide, as well as water.

BRIEF SUMMARY OF THE INVENTION

The present invention is a method for production of a hydrogen-rich fuel gas compatible for a fuel cell, comprising; reforming a hydrocarbon-containing fuel to a CO-containing, hydrogen-rich reformate, converting CO in the reformate to $CO_2$ and hydrogen by a catalyzed water-shift reaction, removing residual CO in the reformate by adsorption on a copper halide adsorbent, and passing the essentially CO-free reformate as a hydrogen-rich fuel gas to a fuel cell.

DETAILED DESCRIPTION OF THE INVENTION

Figure 1:
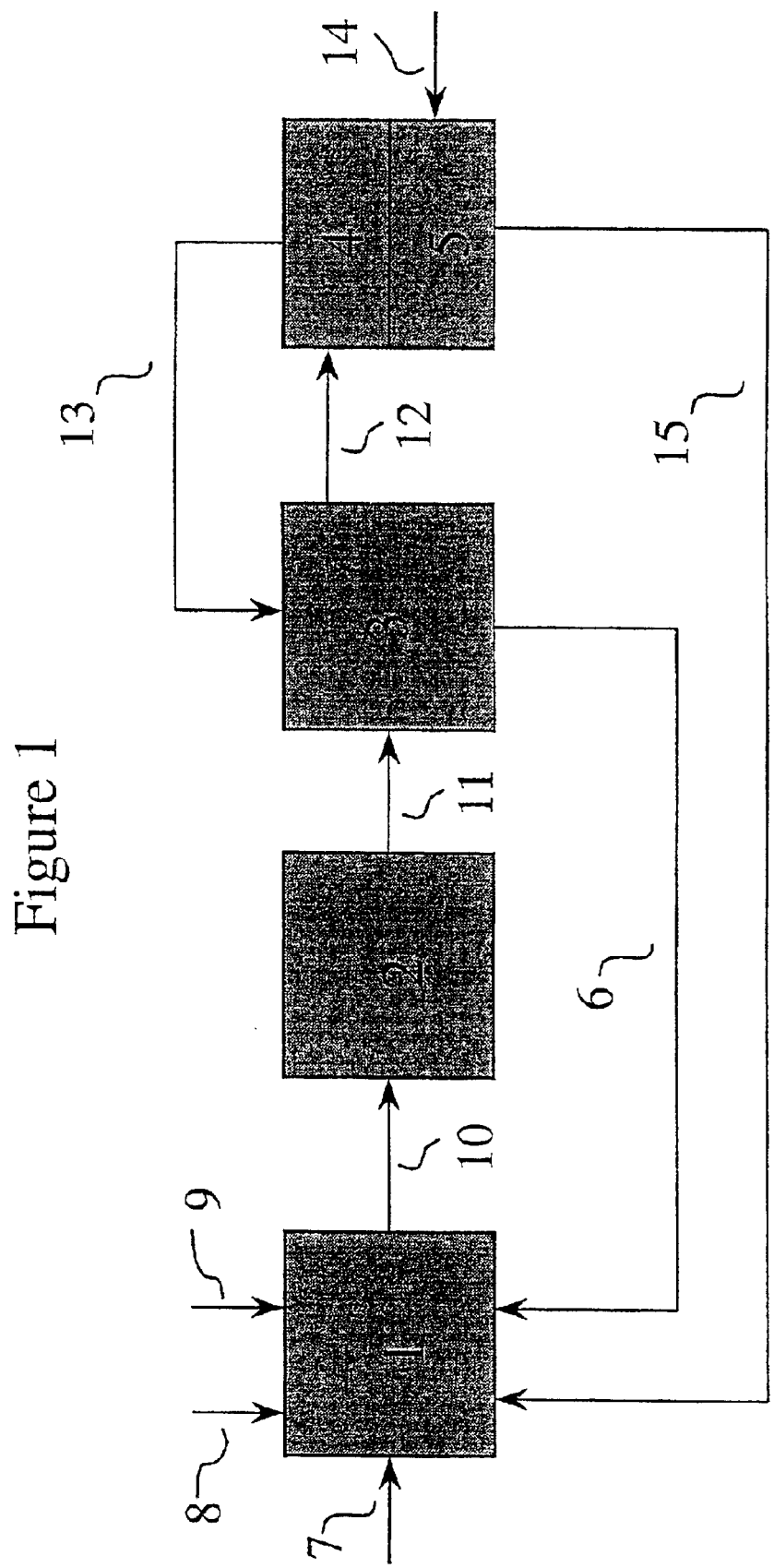
FIG. 1 is a schematic illustration of one embodiment of the present invention.

The present invention is a process for the production of CO-free $H_2$. In this process, impure $H_2$ is produced by some form of hydrocarbon reforming, such as steam methane reforming or partial oxidation of various hydrocarbons. The $H_2$-rich synthesis gas produced is then subjected to an adsorption process in which only CO and water are removed from the gas, producing a dry, CO-free $H_2$ stream. The process can be performed in a pressure or vacuum swing adsorption system that employs an adsorbent with selectivity for CO over $CO_2$, $CH_4$, $N_2$ and $H_2$.

The preferred adsorbent is CuCl supported on various supports, including alumina, carbon and zeolite. The process is carried out in two or more switching adsorption beds, wherein one bed is on feed gas production while the other bed or beds are on various stages of regeneration, including desorption, purging, repressurization and potentially pressure equalization between beds. The adsorbed CO is desorbed using CO-free gas, which could include $H_2$-rich product exiting from the adsorption system or could be purge gas exiting from the anode section of the fuel cell. The process produces CO-free $H_2$, but the $H_2$-rich gas could contain other synthesis gas impurities.

The adsorption process operates at high feed temperature, can operate at low feed pressure and can produce a $H_2$ stream with essentially no CO. The $H_2$ produced by the process is especially useful for fuel cell applications that require CO-free $H_2$, but can tolerate impurities like $CO_2$, $CH_4$ and $N_2$. Some typical preferred ranges of operation include:

Feed temperature from 50 to 150° C.

Feed pressure from 1 to 10 atm absolute.

Regeneration pressure from 0.1 to 2 atm absolute.

Adsorbent particle size from 2 to 0.25 mm.

CO impurity levels of 100 ppm or less, preferably less than 10 ppm.

Adsorption vessels may contain water removal prelayer of desiccant including alumina, silica gel or zeolite.

Referring now to FIG. 1, a hydrocarbon feed 7 (natural gas, methanol, gasoline etc.) is feed into a reformer 1 with steam 9 and/or air 8 to produce a $H_2$-containing stream 10, which typically also contains CO, $CO_2$, $N_2$, and $CH_4$. The effluent 10 from the reformer 1 enters into a shift converter 2, which reacts CO and a $H_2$ to form $CO_2$ and a $H_2$. The shift effluent 11 is then sent to a pressure(vacuum) swing adsorption system P(V)SA 3. This P(V)SA 3 is essentially a device to remove CO from the synthesis gas stream down to 100 ppm or less, or more preferably 10 ppm or less. The purge gas 13 used to regenerate the P(V)SA 3 can be the effluent from the P(V)SA or anode vent gas 4. The CO-containing purge gas 6 from P(V)SA 3 can be recycled to the reformer 1 to capture the carbon value and co-adsorbed hydrogen. The CO-free effluent 12 from the P(V)SA 3 enters the anode 4 of a fuel cell in which hydrogen is converted to protons and electrons. A proton exchange membrane between the anode and the cathode allows protons to pass through to the cathode 5 side of the fuel cell. Electrons cannot pass through this membrane and thereby flow through an external circuit in the form of electric current. In the cathode, oxygen, protons and electrons combine to produce water and heat. The cathode vent gas 15 is then returned to the reformer 1.

The utility of this concept is demonstrated in Example 1 below.

EXAMPLE 1

A computer simulation program was used to estimate the performance of a PSA for removal of CO from a $H_2$-rich stream. The adsorbent used in the simulation is a 15 wt % CuCl on alumina adsorbent, produced as in U.S. Pat. No. 5,175,137, which is incorporated herein by reference in its entirety. A 4-bed PSA cycle with 2 pressure equalizations (U.S. Pat. No. 3,986,849 incorporated herein by reference in its entirety) was simulated at a feed temperature of 80° C., feed pressure of 4.5 atm absolute. The bed was desorbed at 1.5 atm absolute with product gas from the PSA. The feed composition was 65% $H_2$, 25% $CO_2$, 1% CO, 6% $N_2$ and 3% $CH_4$. The PSA product had a composition of 84% $H_2$, 6% $CO_2$, 7% $CH_4$, 3% $N_2$ and 10 ppm CO. The overall $H_2$ recovery of the system was 75%.

EXAMPLE 2

A computer simulation program was used to estimate the performance of a prior art $H_2$ PSA for production of CO-free $H_2$, as depicted in U.S. Pat. No. 3,986,849, using 4 adsorption vessels filled with activated carbon (70% of bed volume) at the feed end of the bed and 5A zeolite (30% of bed volume) at the product end of the bed. The resultant PSA performance at 10 ppm CO in the $H_2$ product was a $H_2$ recovery of 65%. The $H_2$ recovery of the PSA in Example 1 is clearly superior.

The present invention has been set forth with regard to a preferred embodiment of the present invention, but the scope of the present invention should be ascertained from the claims which follow.

What is claimed is:

1. A method for production of a hydrogen-rich fuel gas compatible for a fuel cell, comprising: reforming a hydrocarbon-containing fuel to a CO-containing, hydrogen-rich reformate, converting CO in the reformate to $CO_2$ and hydrogen by a catalyzed water-shift reaction, removing residual CO in the reformate by adsorption on a copper halide adsorbent, and passing the essentially CO-free reformate as a hydrogen-rich fuel gas to a fuel cell.

2. The method of claim 1 wherein said copper halide is selected from the group consisting of copper chloride, copper iodide, copper bromide, copper fluoride and mixtures thereof.

3. The method of claim 1 wherein said copper halide is supported on a substrate.

4. The method of claim 3 wherein said substrate is selected from the group consisting of alumina, carbon, zeolite and mixtures thereof.

5. The method of claim 1 wherein said reformate contains hydrogen, carbon monoxide, carbon dioxide, methane, and nitrogen.

6. The method of claim 5 wherein said copper halide is selective for adsorption of carbon monoxide more preferentially than to hydrogen, carbon dioxide, methane, and nitrogen.

7. The method of claim 1 wherein said adsorption is pressure swing adsorption.

8. The method of claim 1 wherein said adsorption is vacuum swing adsorption.

9. The method of claim 1 wherein said copper halide is copper chloride supported on alumina.

10. The method of claim 1 wherein said adsorption is conducted in switching parallel connected adsorption beds of copper halide.

* * * * *